Figures 8, 10:
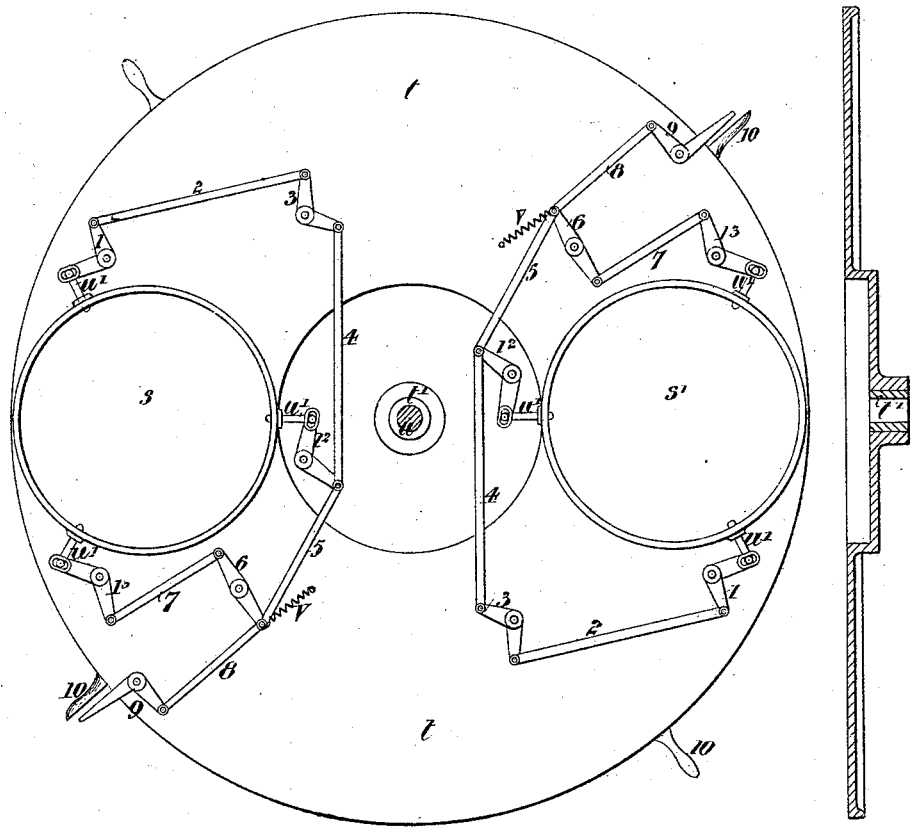

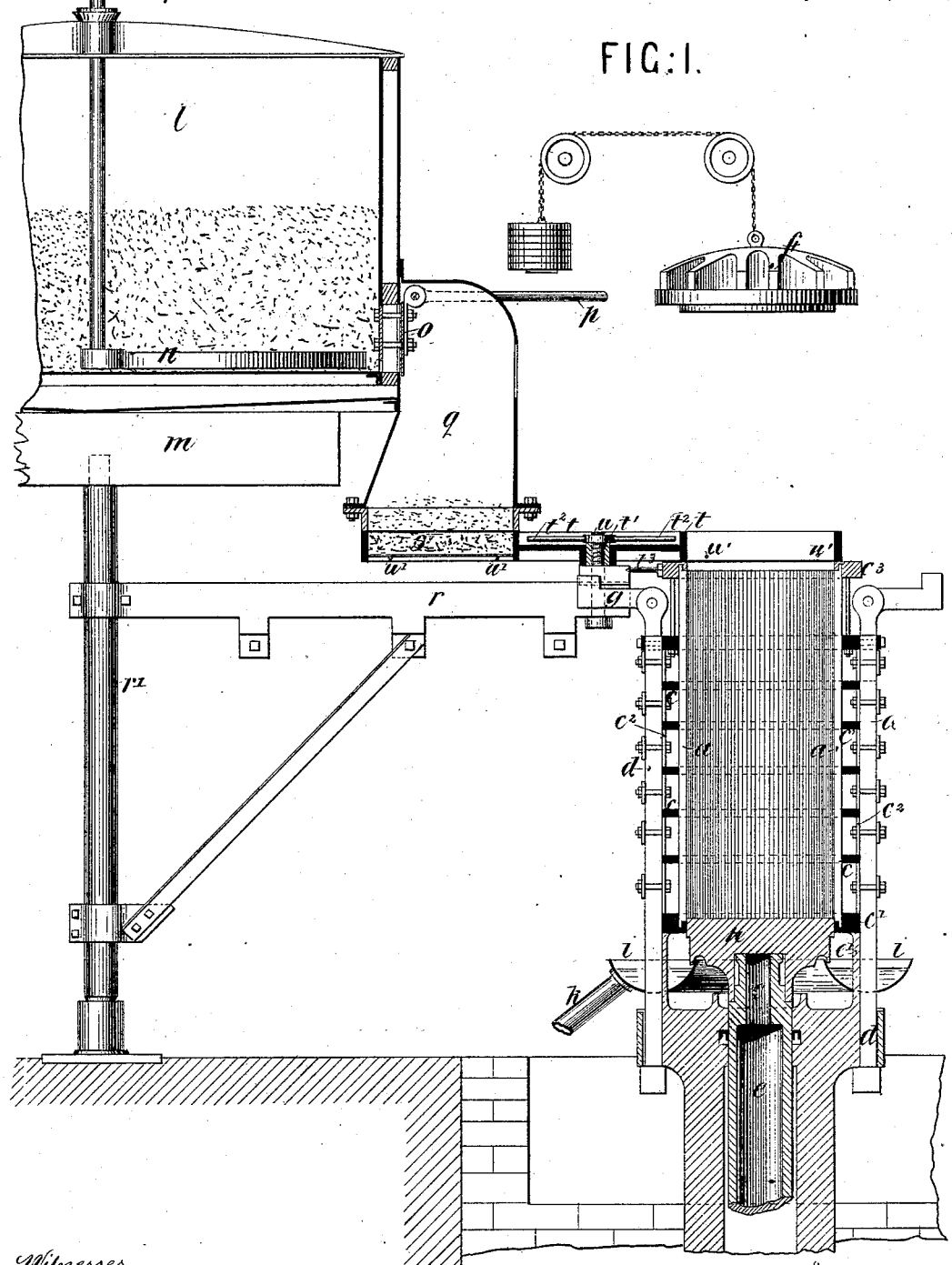

(No Model.) 4 Sheets—Sheet 2.
W. BUSHELL & W. T. HAYDON.
EXPRESSING OIL FROM SEED AND THE MANUFACTURE OF OIL CAKES THEREFROM.
No. 279,330. Patented June 12, 1883.
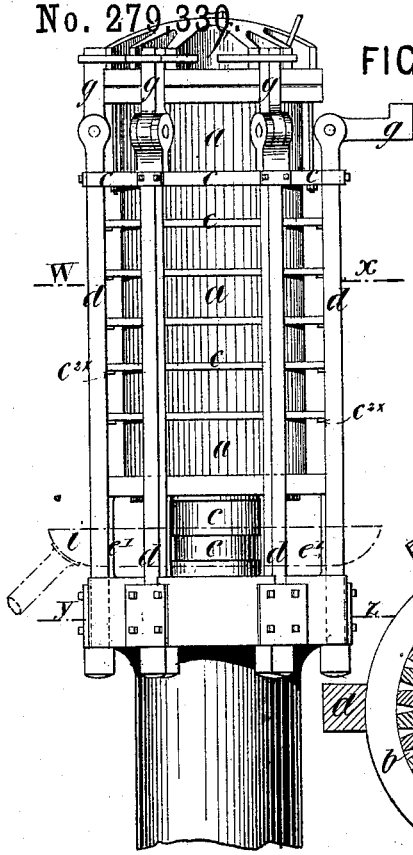
FIG: 2.
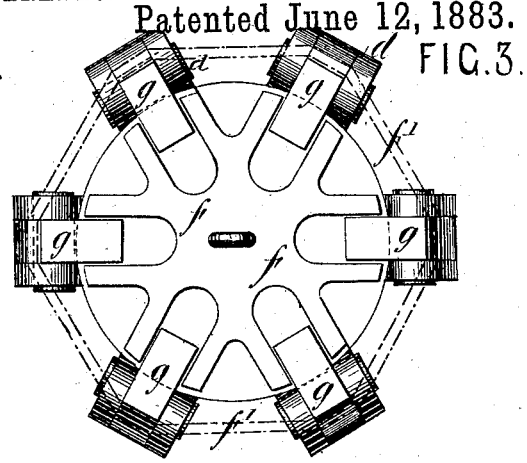
FIG: 3.
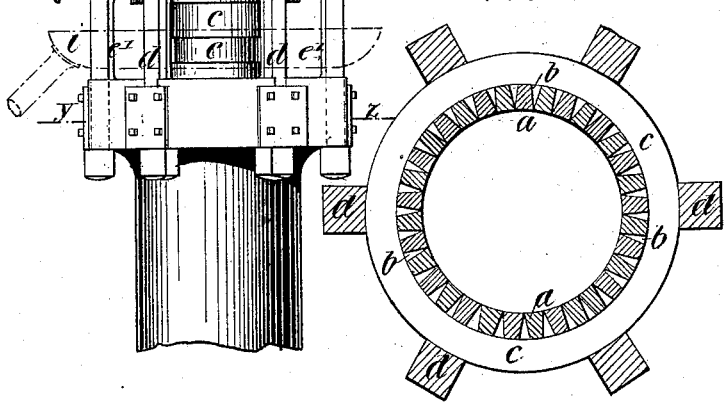
FIG: 4.
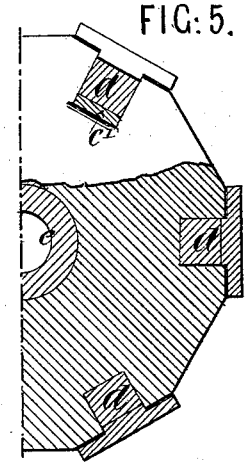
FIG: 5.
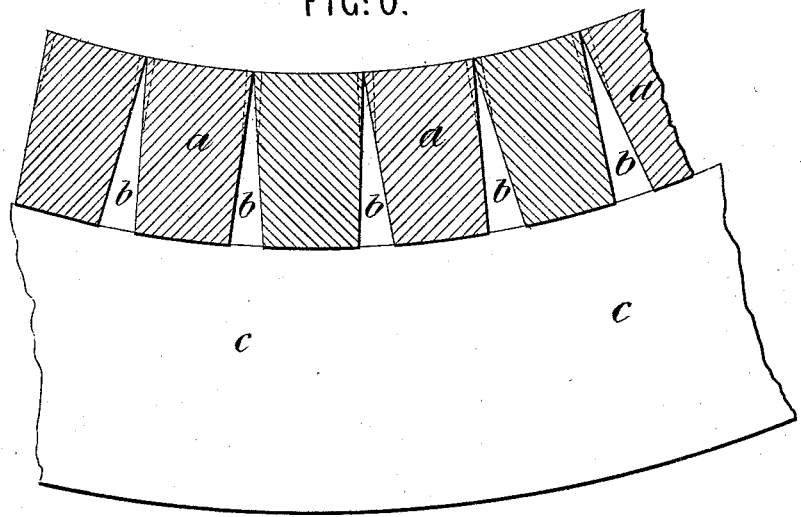
FIG: 6.
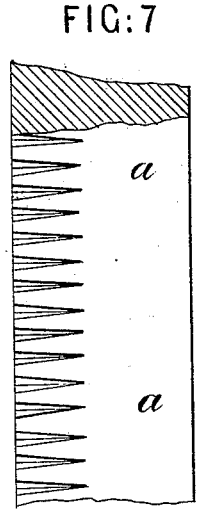
FIG: 7
Witnesses
Chas. H. Smith
J. Haily
Inventors
William Bushell
Walter T. Haydon
per Lemuel W. Serrell
Atty
N. PETERS, Photo-Lithographer, Washington, D. C.

(No Model.) 4 Sheets—Sheet 3.

W. BUSHELL & W. T. HAYDON.
EXPRESSING OIL FROM SEED AND THE MANUFACTURE OF OIL CAKES THEREFROM.

No. 279,330. Patented June 12, 1883.

Witnesses
Chas H Smith
J. Haily

Inventors
William Bushell
Walter T. Haydon
per Lemuel W. Serrell atty

N. PETERS, Photo-Lithographer, Washington, D. C.

(No Model.) 4 Sheets—Sheet 4.
W. BUSHELL & W. T. HAYDON.
EXPRESSING OIL FROM SEED AND THE MANUFACTURE OF OIL CAKES THEREFROM.
No. 279,330. Patented June 12, 1883.
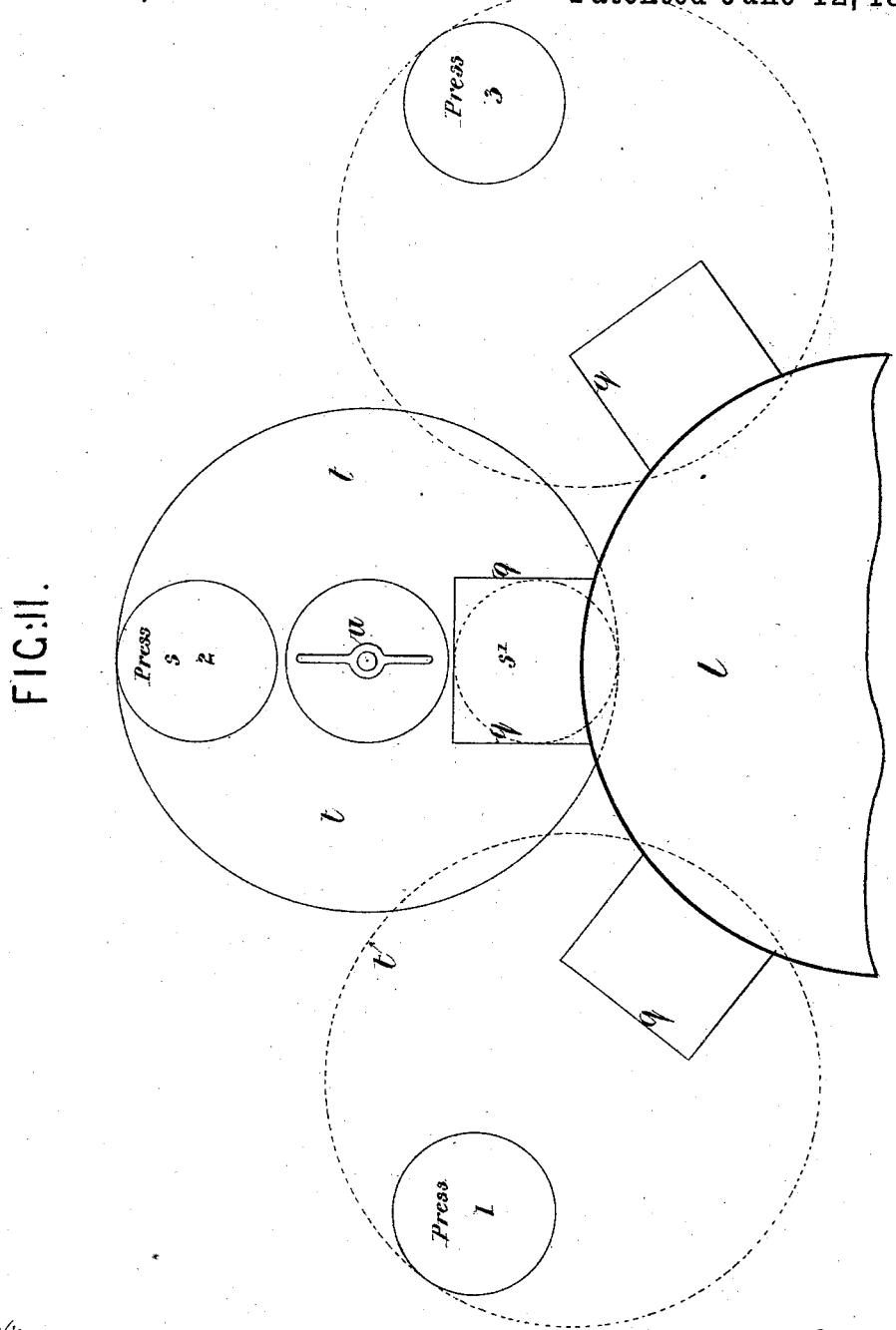

UNITED STATES PATENT OFFICE.

WILLIAM BUSHELL AND WALTER T. HAYDON, OF DOVER, COUNTY OF KENT, ENGLAND.

EXPRESSING OIL FROM SEED AND THE MANUFACTURE OF OIL-CAKES THEREFROM.

SPECIFICATION forming part of Letters Patent No. 279,330, dated June 12, 1883.

Application filed May 7, 1883. (No model.) Patented in England October 2, 1882, No. 4,686; in France March 31, 1883, and in Belgium April 3, 1883.

*To all whom it may concern:*

Be it known that we, WILLIAM BUSHELL and WALTER THOMAS HAYDON, subjects of the Queen of Great Britain, and residents of Dover, in the county of Kent, England, have invented new and useful Improvements in Machinery or Presses for Expressing Oil from Seed and in the Manufacture of Oil-Cakes therefrom, of which the following is a specification.

Attempts have heretofore been made to construct presses for the expressing of oil from seeds, of circular or other suitable form, and it has also been proposed to make the strainer or sides of such a press of metal laths or bars; but difficulties have been experienced in the construction and arrangement of such presses in order to enable the oil to freely escape from the press when the pressure is applied. Now, according to our invention we believe this difficulty has been overcome.

According to our invention, we prefer to make the press proper, or the vessel in which the seed is compressed, and from which seed the oil is expressed, of a cylindrical form, though other forms may be adopted, if preferred. We will describe our invention as applied to a press of cylindrical shape. The sides of this cylinder are made up or composed of a series of bars or rings, preferably bars of a rectangular or trapezoidal section, although other shaped sections of bars might be used. When composed of bars of rectangular section, these are placed side by side in such manner that the inner corners of two adjacent bars shall touch each other, while the two outer corners of the same bars are removed from each other, and thus forming, when the bars are of a rectangular shape, a triangular space between the said bars. In all cases there must be a space (more or less) between the outer edges of the bars, and the shape of this space must consequently be varied according to the shape of the bars composing the cylinder. The object of arranging the bars in the manner before described is to allow a free passage for the expressed oil, as well as for any seed or particles of same that might escape between the bars. On the sides of the bars there are or there may be grooves or indentations extending from the points of junction of the bars partially or wholly across the said bars; but generally they need only extend to about midway across, or less. The aforesaid bars composing the sides of the cylinder may be placed side by side, reaching from end to end of the cylinder, which we prefer in a straight line or diagonally. These bars may also be made into rings placed one above the other, leaving the triangular or other shaped space between the rings; but this arrangement we do not find so advantageous for the free escape of the oil. The press proper, constructed as before described, is held together and supported on all sides by horizontal rings at suitable distances apart, the whole being held together by vertical columns extending from end to end of the press, bolted at bottom to the ram-cylinder; and the top of the press is so constructed that the cover, which may be secured by dog-hooks, may be removed with facility—by a counter-weight, for example, or in any other convenient manner—for the filling and discharging of the press. The bottom or base of the press is movable up and down in the said space, and this movable bottom is the top or head of a ram, to which motion is imparted by hydraulic or other pressure.

In order that our invention may be more fully understood, we will now proceed to describe the same with reference to the accompanying drawings.

Figure 9:
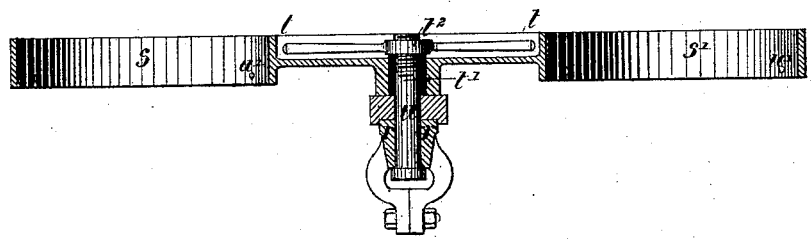

Figure 1 is a longitudinal vertical section of a press and apparatus or machinery connected therewith for expressing oil from seeds, all constructed according to our invention. Fig. 2 is an external side elevation of the press proper. Fig. 3 is a plan of the press shown at Fig. 2, but drawn on a somewhat larger scale than it is in that figure. Fig. 4 is a horizontal section through the line W x of Fig. 2. Fig. 5 is a horizontal section, on line Y Z of Fig. 2, of one-half of the ram-cylinder. Fig. 6 is a horizontal section of a portion of the walls of the press, drawn on a larger scale than the preceding figures in order to more clearly illustrate the arrangements of the bars and rings composing the press. Fig. 7 is an elevation of a portion of one of the bars forming the sides of the press, showing the indentations or notches on the edge for allowing the oil to escape freely. Fig. 8 is a plan of the under side of the mechanical appliance which we prefer to use for filling, supplying, and measuring to the press the required quantity of seed for each cake. Fig. 9 is a longitudinal vertical section through same, and Fig. 10 is a section taken at right angles to Fig. 9. Fig. 11 is a diagram plan for the purpose of describing and illustrating the particular arrangement we prefer to use for filling, supplying, and working a number of presses.

Similar letters of reference refer to like parts in all the figures.

$a$ are the bars forming the sides of the press-cylinder, more particularly shown at Figs. 4, 6, and 7.

$b\ b$ are the spaces between the bars $a$, (shown in the drawings, as we prefer, of a triangular shape.) Although we have here only shown a cylindrical press or press-box, we would have it understood that our invention is equally applicable to square or rectangular shaped press-boxes; but obviously the bars $a$ would then not be of a rectangular section, but of a taper section, so as to leave the required intermediate taper spaces, $b$.

$c\ c$ are the horizontal rings around the press, and $d\ d$ are the vertical columns.

$e$ is the hydraulic ram to the cylinder, to which latter the columns $d$ are bolted at bottom. These columns $d\ d$ pass through a ring on the press-cylinder, as shown, and the dog-hooks $g$ are connected to them at top for securing the press-cover, all as hereinafter more particularly described.

$f$ is the cover, which in the drawings, Fig. 1, is shown raised from the press by a counter-balance-weight.

$g\ g$ are the dogs for securing the cover $f$ to the press when the same is in action, as hereinafter described, and these dogs are retained in position by hinged clips on the cover, as shown at Fig. 2, or by a ring or hoop, $f'$, as in Fig. 3, or by other convenient means.

$h$ is the bottom or base of the press, and at the same time forming the head of the ram.

$i$ is the gutter surrounding the base of the press for the reception of the expressed oil, and $k$ is the pipe by which the same is conveyed away to any suitable receptacle.

$c'$ is the bottom support for the rings $c$, which support rests on brackets or lugs $e'$, projecting from the cylinder.

$c^2$ shows the division-plates between and supporting the rings $c$, which plates are secured round columns $d\ d$ by bolts, as shown; or the rings may be supported by pins $c^{2\times}$, for example, as shown at Fig. 2. The top ring $c$ holds the uprights $d$ in position, and is itself bolted to or suspended from the top frame, $c^3$, of the press.

$l$ is the receiver or kettle, in which the seed to be supplied to the press to be pressed is placed. A portion is cut away in the drawing to economize the space.

$m$ is a structure supporting the receiver or kettle, which structure is supported on brick-work, masonry, or in other strong and suitable manner.

$n$ is a stirrer in the receiver or kettle $l$, to which a rotary motion may be imparted to stir up the contents by a shaft, on which it is mounted, receiving motion from any convenient prime mover.

$o$ is a door in the receiver, and $p$ is a lever for opening and closing same when required, so as to allow seed from the receiver or kettle to pass out to the feeding-box, $q$, and which latter supplies the seed to the mechanical appliance, or what we may call a "cake-maker," which delivers it to the press.

Immediately below the feeding-box $q$ the mechanical appliance shown at Figs. 8, 9, and 10 is placed. This is free to slide along the jib or crane-arm $r$, swinging from the post $r'$, when at the end of the jib or crane-arm $r$, and in the position shown. At Fig. 1 of the drawings one lot of seed sufficient to make a cake is being received from the receiver or kettle $l$ by the box or kettle-mouth $q$, and the other is being deposited in the press, although in the drawings the ram is shown at the bottom.

$s\ s'$ are the two frames for receiving the seed. These are connected to or formed in a piece with the table or platform $t$, and are of the same or corresponding shape and lateral dimensions as the cakes which are to be made.

$u$ is the spindle or clamping-bolt on which the table $t$ is mounted, in order that the table $t$ and the seed-frames $s\ s'$ may, when required, be rotated. The interior of the frames $s\ s'$ corresponds in size with that of the internal diameter of the press, or with that of the plates which fit into the press and divide the cakes. These plates are in the first place—one, at least, of such plates—placed in the frames $s\ s'$, and they are then supported by bolts or catches passing through apertures in the sides of the seed-frames $s\ s'$, and these catches are kept projected into the seed-frames by means of a spring marked V, Fig. 8. $u'\ u'\ u'$ are these bolts or catches (best seen at Fig. 8,) each of which is jointed to a bell-crank lever, 1 $1^2$ $1^3$. Bell-crank lever 1 is connected by the lever 2 to bell-crank lever 3, which, by link 4, is connected to the bell-crank lever $1^2$, which latter, by link 5, is connected to one arm of lever 6, which, by its other arm, is jointed to link 7, which, again, is jointed to bell-crank lever $1^3$.

8 is the link connecting the lever 6 to the cranked handle or lever 9 for operating the whole series. This latter handle or lever is kept open by means of the spring V, and when open the catches are projecting from the sides of the seed-frames, ready to receive the plate. To disengage or drop the plate, the handle 9 is pressed against the handle 10, which handle is used for turning the table $t$ round. This pressing withdraws the catches from the interior of the seed-frame and leaves the contents of the frame free to fall. The lever 9 being released, the spring immediately projects the catches beyond the side of the seed-frame, ready to receive another plate; but of course it might work without springs, and it should be noticed that this lever apparatus is fitted to each of the frames $s\ s'$.

The table $t$ can be turned round so as to bring the seed-frames first to the kettle and then to the press, and vice versa, the feeding-box $q$ fitting down closely to the upper surface of the seed-frames $s\ s'$ and flat surface of the table $t$.

The spindle $u$ carries a bush, $t'$, on which the table $t$ revolves, the bush $t'$ somewhat projecting above the recess formed in the center of the table, so that the nut $t^2$ of the bolt $u$, when tightened, secures the bush $t'$ on the jib $r$, while at the same time the table $t$ is free to revolve round the bush $t'$.

Seed is placed in the steam-jacketed kettle $l$—for example, by an elevator or other convenient means—where it is equally heated and stirred by the stirrer $n$, as usual. On commencing operations, and supposing the ram to be at the top of the cylinder, and the table $t$ having been brought into position shown at Fig. 1, so that it comes against the point of a bolt, $t^3$, which projects from the press, or is secured in any other way, the door $o$ is opened by raising the lever $p$, which admits seed to the kettle-mouth or feed-mouth $q$. An attendant places a plate in the frame $s'$, for example, and this plate then rests on the catches $u'$, which are projected outward by the spring V, Fig. 8, operating the levers before described. On this plate a piece of bagging or woolen cloth is placed. The table $t$ is now revolved on the bush $t'$, and as the frame $s'$ is brought or comes beneath the kettle or feed-mouth $q$, the seed fills the frame level with the top of the table, and the frame is thus made to contain a measured quantity of seed, which will be carried in due course round to the press. The corresponding empty frame, $s$, is being fitted with a plate and cloth, as before. The frame $s'$, on arriving over the mouth of the press, is momentarily arrested, and a cloth is placed on the top. The catches $u'$ are withdrawn by the handle 9, and the plate, bottom cloth, cake, and top cloth fall into the press onto the ram, or onto a previous measure of seed that may have been deposited there. This goes on continuously till the whole press is full of measure of seed, at which time the nut on the bolt $u$ is loosened, and the table $t$, sliding on the jib $r$, is pushed back along the jib. The top $f$ of the press is now put on and the dog-hooks $g$ are fixed. The pressure is now applied and the oil expressed, which passes off from the same between the bars $a$, forming the walls of the press, into the spaces $b$, thence to the gutter $i$, whence it is conveyed by the pipe $k$ to suitable receptacles. Sufficient pressure having been applied, the pressure is taken off, the dog-hooks $g$ removed, and the top $f$ lifted or otherwise disposed of. Power is again applied, and the finished cakes forced one by one above the top of the cylinder. The attendant now detaches them with a slice as they rise one at a time until the press is discharged. The ram is now at the top of the press and ready for the process being repeated, and so on, all as before described.

In the arrangement shown at Fig. 11 three separate and distinct presses are shown arranged radially round the kettle, each press being supplied with seed from the kettle, which is common to all, but with a separate feeding-box $q$ for each press. 1, 2, and 3 are the presses. Press 1 being filled, the table $t$ is swung by jib $r$ to press 2, and subsequently to press 3, and so on. Two or more than three presses might be arranged around the kettle; but our invention as thus applied will be completely understood without multiplying the drawings or lengthening this description. We have marked those parts which can be seen in this plan with letters corresponding to the corresponding parts in the previous figures.

By our invention, besides affording greater facilities than heretofore for expressing the oil from seeds by giving much greater space or freer flow for the oil to leave the seed without taking particles of seed with it, it also makes cakes that do not require trimming or paring, the oil being expressed from all parts of the cake equally.

We claim—

1. The press or press-box composed of bars, such as $a$, with side indentations or notches, and of such a form and so arranged side by side that the inner corners of such bars shall touch one another and cause a space, $b$, to be produced between the outer sides of such bars, and so allowing a free passage for oil, and, if necessary, seeds, whereby the clogging up of the press is materially diminished or prevented and the oil freely escapes to the bottom of the press, all substantially as described.

2. In a press for expressing oil from seeds, the combination, with the bars $a$, notched and having spaces $b$, of the rings $c$, columns $d$, plates $c^2$, secured to said columns, and the support $c'$ and bracket $e'$ upon the cylinder of the hydraulic press, and the dogs $g$ for securing the cover $f$, substantially as set forth.

3. The mode of and mechanical appliance or appliances for mechanically and automatically or partially automatically measuring and supplying the seed to the press or series of presses, all constructed, arranged, and operating in combination with oil-press the top of which can be removed, as and for the purposes set forth.

WM. BUSHELL.
W. T. HAYDON.

Witnesses:
WM. BUSSEY,
77 *High Street, Dover, Accountant.*
C. WARREN,
2 *Clyde Cottages, Dover, Merchant's Clerk.*